(12) United States Patent
Maruoka

(10) Patent No.: US 8,662,128 B2
(45) Date of Patent: Mar. 4, 2014

(54) HEAVY DUTY TIRE

(75) Inventor: Kiyoto Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 343 days.

(21) Appl. No.: 13/113,116

(22) Filed: May 23, 2011

(65) Prior Publication Data

US 2012/0060995 A1 Mar. 15, 2012

(30) Foreign Application Priority Data

Sep. 14, 2010 (JP) ................................ 2010-205865

(51) Int. Cl.
*B60C 9/18* (2006.01)
*B60C 9/20* (2006.01)
(52) U.S. Cl.
USPC ............................ 152/526; 152/534; 152/535
(58) Field of Classification Search
USPC .......................................... 152/526, 534, 535
See application file for complete search history.

(56) References Cited

U.S. PATENT DOCUMENTS

| | | | | |
|---|---|---|---|---|
| 2,493,614 A | * | 1/1950 | Bourdon | 152/534 |
| 5,660,654 A | * | 8/1997 | Miyazaki | 152/534 |
| 6,082,427 A | * | 7/2000 | Kohno et al. | 152/532 |
| 2006/0027300 A1 | * | 2/2006 | Maruoka | 152/534 |
| 2006/0102269 A1 | * | 5/2006 | Uchida et al. | 152/532 |
| 2007/0084533 A1 | * | 4/2007 | Numata | 152/209.5 |

FOREIGN PATENT DOCUMENTS

| | | | |
|---|---|---|---|
| JP | 2001-328406 | * | 11/2001 |
| JP | 2004-216977 | * | 8/2004 |
| JP | 2005-212742 A | | 8/2005 |
| JP | 2009-012539 | * | 1/2009 |

OTHER PUBLICATIONS

English machine translation of JP2004-216977, dated Aug. 2004.*
English machine translation of JP2009-012539, dated Jan. 2009.*

* cited by examiner

*Primary Examiner* — Justin Fischer
*Assistant Examiner* — Robert Dye
(74) *Attorney, Agent, or Firm* — Birch, Stewart, Kolasch & Birch, LLP

(57) ABSTRACT

A heavy duty tire comprises a belt disposed radially outside a carcass. The belt consists of a innermost first ply, a second ply and a outermost third belt ply. With respect to the tire equator, the cords of the first ply are laid at an angle $\theta 1$ of 15 to 25 degrees; the cords of the second ply are laid at an angle $\theta 2$ of 15 to 25 degrees; the cords of the third ply are laid at an angle $\theta 3$ of 45 to 60 degrees; the cords of the second ply are inclined oppositely to the cords of the first ply; the cords of the third ply are inclined to the same direction as the cords of the second ply; $|\theta 2-\theta 1|$ is not more than 5 degrees; $|\theta 3-\theta 2|$ is 30 to 45 degrees; the axial widths W1, W2 and W3 of the first, second and third belt plies, respectively, satisfy W1>W2>W3; strengths S1, S2 and S3 of the first, second and third belt plies, respectively, satisfy S1>S2>S3 and 1.0>S2/S1>=0.6.

8 Claims, 4 Drawing Sheets

HEAVY DUTY TIRE

BACKGROUND OF THE INVENTION

The present invention relates to a heavy duty tire, more particularly to a tread reinforcing belt having a three-ply structure capable of reducing its weight and capable of increasing the retreadability.

In the heavy duty tires such as truck/bus tires, heretofore, in order to secure safety and dynamic performance, the tread portion is reinforced by a belt made up of four plies of steel belt cords as shown in FIG. 5(A). Particularly, in order to improve the dynamic performance, the radially innermost first belt ply A1 is provided with a cord angle θ1 of a relatively higher value of from 40 to 60 degrees with respect to the tire equator C. And in order to increase the tire binding force of the belt and thereby to secure safety, the second, third and fourth belt plies A2, A3 and A4 disposed radially outside the first belt ply A1 are provided with cord angles θ2, θ3 and θ4 of relatively lower values of from 15 to 30 degrees with respect to the tire equator C.

In recent years, on the other hand, in order to reduce tire weight, there has been proposed a heavy duty tire in which the number of belt plies constituting the belt is reduced to three, as disclosed in Japanese patent application publication JP-A-2005-212742. In this heavy duty tire, as shown in FIG. 5(B), the cord angles θ1 to θ3 of the first to third belt plies A1 to A3 are set in a range of 16 to 22 degrees, and with respect to the tire equator, the belt cords of the first belt ply A1 are inclined oppositely to those of the second and third belt plies A2 and A3.

In this belt structure, although the belt cords of the first belt ply A1 cross those of the second belt ply A2, since the cord angles θ1 to θ3 are 16 to 22 degrees, namely, relatively small, the in-plane rigidity of the belt becomes relatively low, therefore, there is a problem with deterioration in the dynamic performance.

On the other hand, when a worn tire is reused by retreading, usually the tread rubber is removed together with the outermost belt ply, and then replaced with new ones.

In the case of the above-mentioned heavy duty tire provided with the three-ply belt structure, the outermost third belt ply A3 and the inner second belt ply A2 are inclined towards the same direction with respect to the tire equator, and the difference between their cord angles θ2 and θ3 are small. As a result, in the used heavy duty tire, the belt cords of the third belt ply A3 are very liable to sink between the belt cords of the second belt ply A2, in other words, the third belt ply A3 and second belt ply A2 become united, and it is very difficult to separate or remove the outermost third belt ply A3 only. Thus, the retreading of such tire is difficult.

If the third and second belt plies A3 and A2 are removed together, the retreading becomes almost impossible due to the following reasons. In the retread process, the tire is needs to be inflated. Since the two belt plies A3 and A2 have been removed from the tire, namely, the tire has only the innermost belt ply A1, the tire binding force of the belt is insufficient. And the remaining belt cords are oriented in one direction which is inclined with respect to the tire circumferential direction. Accordingly, when the tire is inflated, the tire gets distorted. Thus, the retreading is very difficult or almost impossible.

SUMMARY OF THE INVENTION

It is therefore, an object of the present invention to provide a heavy duty tire, in which although a three-ply belt structure is employed in order to reduce the tire weight, the retreadability of the worn tire is increased, and at the same time, the deterioration of dynamic performance is inhibited.

According to the present invention, a heavy duty tire comprises a tread portion, a pair of sidewall portions, a pair of bead portions each with a bead core therein, a carcass made of carcass cords and extending between the bead portions through the tread portion and the sidewall portions, and a belt disposed radially outside the carcass in the tread portion, the belt consisting of a radially innermost first belt ply disposed on the carcass, a second belt ply disposed on the first belt ply, and a radially outermost third belt ply disposed on the second belt ply, wherein the first belt ply is made of belt cords laid at an angle θ1 of 15 to 25 degrees with respect to the tire equator, the second belt ply is made of belt cords laid at an angle θ2 of 15 to 25 degrees with respect to the tire equator, the third belt ply is made of belt cords laid at an angle θ3 of 45 to 60 degrees with respect to the tire equator, wherein with respect to the tire equator, the belt cords of the second belt ply are inclined oppositely to the belt cords of the first belt ply, and with respect to the tire equator, the belt cords of the third belt ply are inclined to the same direction as the belt cords of the second belt ply, the difference |θ2−θ1| between the angles θ1 and θ2 is not more than 5 degrees, the difference |θ3−θ2| between the angles θ2 and θ3 is in a range of from 30 to 45 degrees, the axial widths W1, W2 and W3 of the first, second and third belt plies, respectively, satisfy W1>W2>W3, ply strengths S1, S2 and S3 of the first, second and third belt plies, respectively, satisfy S1>S2>S3, and 1.0>S2/S1>=0.6.

Here, the ply strengths S1, S2 and S3 (generically referred to as "ply strength S") is the summation of the breaking loads (kN) of the belt cords included in 5 cm width of the belt ply. (unit is kN/5 cm) Accordingly, in each belt ply, if one kind of belt cord is used, the ply strength S thereof can be defined as the product of the breaking load (kN) of one belt cord and the cord count N per 5 cm width of the belt ply.

The breaking load of the cord is measured at a tension rate 50 mm/min according to Japanese Industrial standard JIS-G3510 "Testing methods for steel tire cords", sec. 6.4 "breaking load".

In this application including specification and claims, various dimensions, positions, directions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at various cold Inflation Pressures" table in TRA or the like.

The standard load is the "maximum load capacity" in JATMA, the "Load Capacity" in ETRTO, the maximum value given in the above-mentioned table in TRA or the like.

The tread width TW is the axial distance between the tread edges measured in the normally inflated unloaded condition of the tire. The tread edges are the axial outermost edges of the ground contacting patch (camber angle=0) in the normally inflated loaded condition.

According to the present invention, the belt has a three-ply structure in order to reduce the tire weight. Further, the first and second belt plies have relatively small cord angles $\theta 1$ and $\theta 2$ of from 15 to 25 degrees in order to increase the tire binding force and thereby to secure safety. The inclining direction of the belt cords of the first belt ply is opposite to that of the second belt ply, therefore, the cords of one ply cross those of the other ply. Since the belt cords of the third belt ply have a cord angle $\theta 3$ of from 45 to 60 degrees, they cross the belt cords of the first belt ply and the belt cords of the second belt ply.

Therefore, the belt is provided with a stiff truss construction in which the belt cords as a whole are arranged in a triangular manner rather than a pantograph (or rhombic) manner.

As a result, the in-plane rigidity of the belt is maintained at a high level, and the deterioration of the dynamic performance can be avoided.

Since the cord angles of the second and third belt plies have a difference in the range of 30 to 45 degrees, it is prevented that the belt cords of the third belt ply A3 sink between the belt cords of the second belt ply A2 and these plies A3 and A2 are united with each other. Accordingly, it is possible to easily remove the outermost third belt ply only, and the retreadability is improved.

Further, the first belt ply having a relatively low cord angle of 15 to 25 degrees and thus having a strong tire binding force is formed as the widest belt ply, and the first belt ply is provided with a ply strength S1 larger than the ply strengths S2 and S3 of the second and third belt plies. Therefore, in spite of a three-ply structure, the tire binding force is increased sufficiently to secure the safety.

Furthermore, as the ply strength S1 is high, the resistance to shock during running can be improved especially.

Still furthermore, since S1>S2>S3 and 0.6=<S2/S1<1.0 are satisfied, it is possible to achieve high resistance to shock and the weight reduction at same time. Especially, by setting the ratio S2/S1 as being not less than 0.6 and less than 0.8, the weight reduction can be enhanced.

DESCRIPTION OF THE PREFERRED EMBODIMENTS

Figure 1:
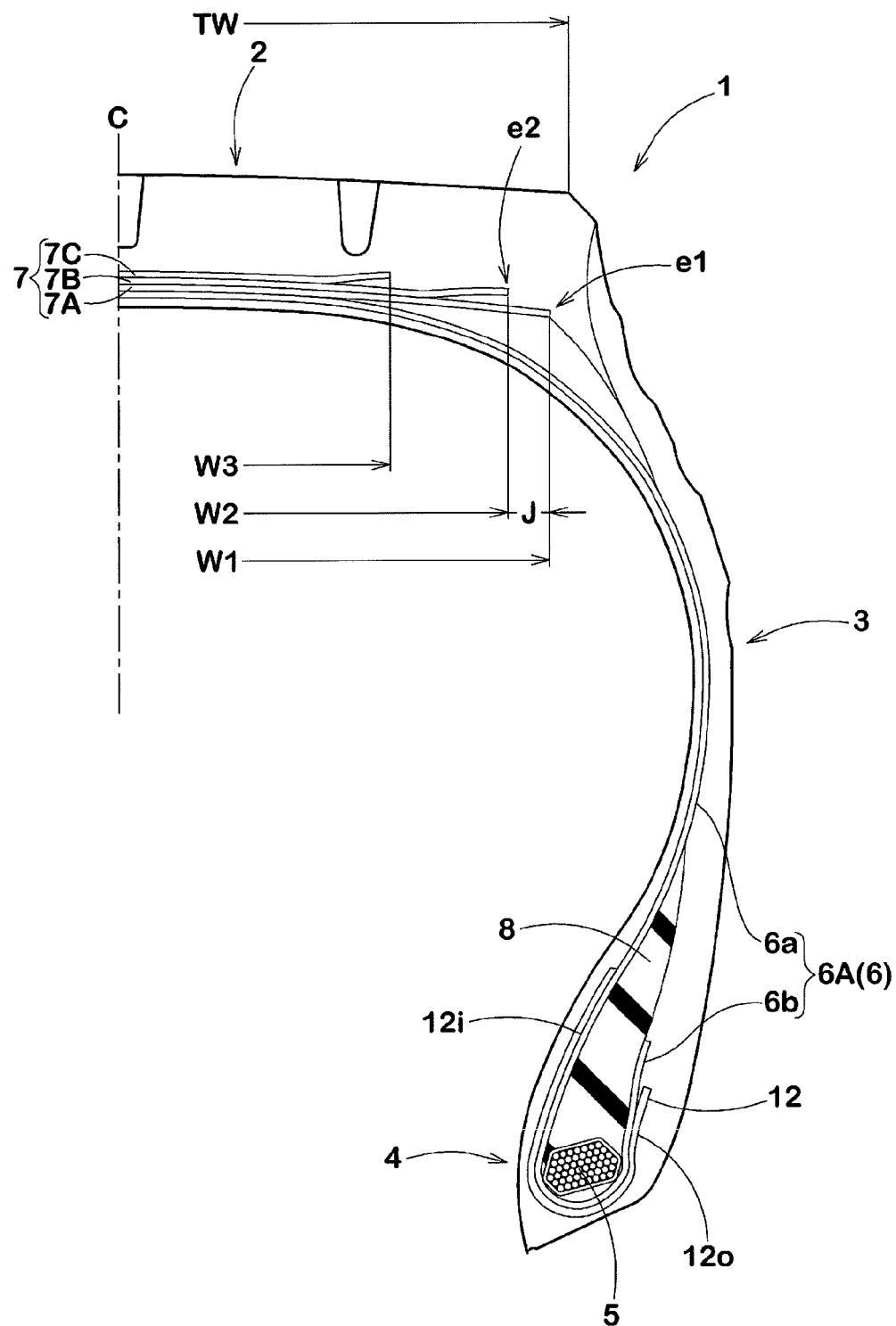
FIG. 1 is a cross sectional view of a heavy duty tire according to the present invention showing its normally inflated unloaded state.

An embodiment of present invention will now be described in detail in conjunction with accompanying drawings.

In the drawings, heavy duty tire 1 according to the present invention comprises a tread portion 2, a pair of sidewall portions 3, a pair of bead portions 4 each with a bead core 5 therein, a carcass 6 extending between the bead portions 4 through the tread portion 2 and sidewall portions 3, and a belt 7 disposed radially outside the carcass 6 in the tread portion 2.

The carcass 6 is composed of at least one carcass ply 6A, in this embodiment only one carcass ply 6A having a radial structure in which carcass cords are arranged at an angle of from 80 to 90 degrees with respect to the tire equator C. The carcass ply 6A is extended between the bead portions 4 through the tread portion 2 and sidewall portions 3, and turned up around the bead core 5 in each of the bead portions from the inside to the outside of the tire to be secured thereto. Thus, the carcass ply 6A has a pair of turned up portions 6b and a main portion therebetween.

As the carcass cords, steel cords are preferably used. However, if desired, it is also possible to construct the carcass 6 by using a plurality of plies of organic fiber cords, e.g. aromatic polyamide, rayon and the like.

Between each of the turned up portions 6b and the main portion 6a of the carcass ply 6A, there is disposed a bead apex rubber 8 extending radially outwardly from the bead core 5 in a tapered manner in order to reinforce the bead portion 4 and increase the bending rigidity.

In this embodiment, in order to further reinforce the bead portions 4, each bead portion 4 is provided with a bead reinforcing layer 12 made up of a steel cord ply composed of steel cords laid at, for example, an angle of from 10 to 60 degrees with respect to the tire circumferential direction.

The bead reinforcing layer 12 in this embodiment is composed of a base part radially inside the bead core 5, an axially outer part 12o extending radially outwardly from the base part along the axially outside of the turned up portion 6b of the carcass ply 6A, and an axially inner part 12i extending radially outwardly from the base part along the axially inside of the main portion 6a of the carcass ply 6A so as to have a u-shaped cross-sectional shape.

It is however, also possible that the bead reinforcing layer 12 is composed of only the axially outer part 12o or only the axially inner part 12i.

The above-mentioned belt 7 is made up of three belt plies 7A, 7B and 7C of steel cords.

Figure 3:
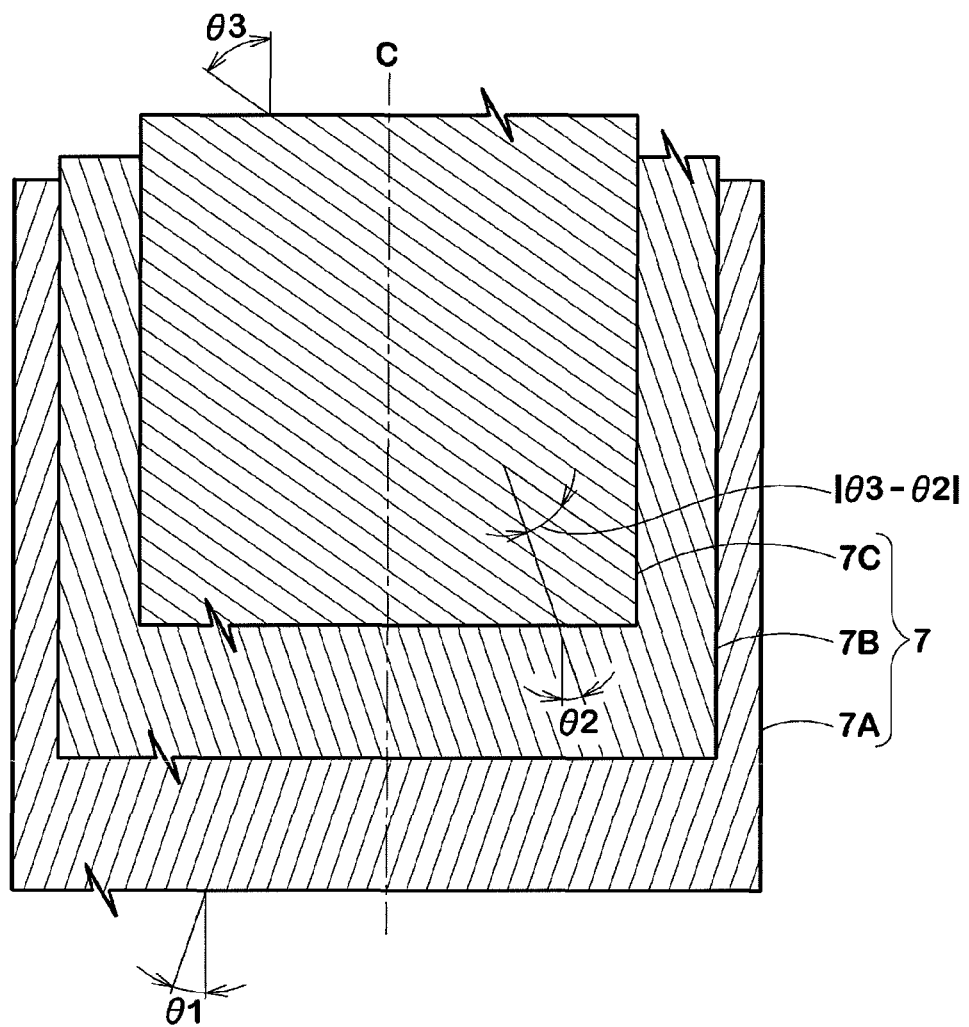
FIG. 3 is a diagram showing an belt cords arrangement of the belt.

As shown in FIG. 3, the radially innermost first belt ply 7A is made of belt cords laid parallel with each other so as to incline at an angle $\theta 1$ of from 15 to 25 degrees with respect to the tire equator C toward one direction (in the figure, inclined diagonally right up).

The second belt ply 7B, which is disposed on the radially outside of the first belt ply 7A, is made of belt cords laid parallel with each other so as to incline at an angle $\theta 2$ of from 15 to 25 degrees with respect to the tire equator C toward the opposite direction to that of the first belt ply 7A with respect to the tire equator C (in the figure, inclined diagonally right down).

The third belt ply 7C, which is disposed on the radially outside of the second belt ply 7B, is made of belt cords laid parallel with each other so as to incline at an angle $\theta 3$ of from 45 to 60 degrees with respect to the tire equator C toward the same direction as the second belt ply 7B with respect to the tire equator C (in the figure, inclined diagonally right down).

As explained above, in the three-ply belt structure, since the first and second belt plies 7A and 7B are provided with relatively small cord angles θ1 and θ2 of 15 to 25 degrees, the tire binding force can be improved in cooperation with the third belt ply 7C. Therefore, as the nature of three-ply belt structure, the weight reduction is possible while maintaining the safety.

Further, the belt cord inclining directions of the first and second belt plies 7A and 7B are opposite to each other and these plies cross each other. And since the cord angle θ3 of the belt cords of the third belt ply 7C is 45 to 60 degrees, the belt cords of the third belt ply 7C cross the belt cords of the first and second belt plies 7A and 7B.

That is, the belt 7 is provided with a stiff truss construction in which the belt cords as a whole are arranged in a triangular manner. Thus, the in-plane rigidity of the belt is maintained at a high level, and the deterioration of the dynamic performance can be avoided.

If the angles θ1 and θ2 exceed 25 degrees and/or the angle θ3 exceeds 60 degrees, then the tire binding force becomes insufficient and it becomes difficult to maintain the safety.

If the angles θ1 and θ2 are less than 15 degrees and/or the angle θ3 is less than 45 degrees, then the in-plane rigidity of the belt is decreased, and it becomes difficult to maintain the dynamic performance.

In the belt 7, it is necessary for securing the steering stability to set the difference |θ2−θ1| between the angles θ1 and θ2 at a value of not more than 5 degrees.

In order to enable the recycling of the tire by retreading, it is necessary to set the difference |θ3−θ2| between the angles θ2 and θ3 at a value of from 30 to 45 degrees.

If the difference |θ2−θ1| exceeds 5 degrees, the motion of the belt 7 during running becomes increased, and the steering stability is deteriorated.

If the difference |θ3−θ2| is less than 30 degrees, there is a tendency that, during use, the belt cords of the third belt ply A3 sink between the belt cords of the second belt ply A2, and they are united. Thus, it becomes hard to retread by removing the third belt ply 7C only.

Incidentally, the upper limit of the difference |θ3−θ2| naturally becomes 45 degrees because θ2=15 to 25 degrees, and θ3=45 to 60 degrees.

As shown in FIG. 1, the axial widths W1, W2 and W3 of the first, second and third belt plies 7A, 7B and 7C, respectively, satisfy the following relationship:

$$W1>W2>W3.$$

It is preferable that the axial width W1 is set to be not less than 0.7 times, more preferably not less than 0.8 times the tread width TW in order to reinforce the substantially entire width of the tread portion 2.

If the axial width W1 is less than 0.7 times of the tread width TW, the tire binding force and rigidity becomes insufficient in the tire shoulder portions, and the steering stability and resistance to uneven wear tend to deteriorate.

If the axial width W1 is too wide, on the other hand, it becomes difficult to retread.

From this standpoint, the upper limit of the axial width W1 is preferably set to be not more than 0.97 times, more preferably not more than 0.95 times the tread width TW.

The axial width W2 of the second belt ply 7B is preferably not less than 0.8 times, more preferably not less than 0.9 times the axial width W1 of the first belt ply 7A.

If the axial width W2 is less than 0.8 times the axial width W1, the tire binding force and rigidity becomes insufficient in the tire shoulder portions, and the steering stability and resistance to uneven wear tend to deteriorate.

If the axial width W2 is too wide, the edge portions of the second belt ply 7B come close to the edge portions of the first belt ply 7A. As a result, stress concentration is caused, and a ply edge separation tends to occur which deteriorates the durability.

From this standpoint, it is preferable that an axial distance J of not less than 5 mm is provided between the axially outer edge e1 of the first belt ply 7A and the axially outer edge e2 of the second belt ply 7B.

From a standpoint of the tire binding force and rigidity, it is preferable that the axial width W3 of the third belt ply 7C is set to be not less than 0.4 times, more preferably not less than 5.0 times the axial width W2 of the first belt ply 7A.

The ply strength S1 of the first belt ply 7A, the ply strength S2 of the second belt ply 7B and the ply strength S3 of the third belt ply 7C satisfy the following conditions (1) and (2):

$$S1>S2>S3 \qquad (1)$$

$$1.0>S2/S1>=0.6. \qquad (2)$$

In this embodiment, in each of the belt plies 7A-7C, one kind of belt cord is used.

Therefore, the ply strength S1 is the product of the belt cord count N1 per 5 cm width of the belt ply 7A and the breaking load E1 in kN of a belt cord in the belt ply 7A.

The ply strength S2 is the product of the belt cord count N2 per 5 cm width of the belt ply 7B and the breaking load E2 in kN of a belt cord in the belt ply 7B.

The ply strength S3 is the product of the belt cord count N3 per 5 cm width of the belt ply 7C and the breaking load E3 in kN of a belt cord in the belt ply 7C.

When the tire runs on rocks and the like, the belt 7 is deformed concavely toward the radially inside of the tire. In such a state of the belt, the tensile stress becomes largest in the radially innermost first belt ply 7A, and gradually decreases in the order of the first, second and third belt plies. Thus, the contribution of the first belt ply 7A to the tire strength (breaking energy) is largest. The next is the second belt ply 7B, and the contribution of the third belt ply 7C is smallest.

Therefore, by setting the ply strength according to the degrees of the contributions, namely, S1>S2>S3, the tire strength can be effectively increased without increasing the overall weight. Especially, by setting the ratio S2/S1 at a values of not less than 0.6 and less than 0.8, the weight reduction can be enhanced.

In this embodiment, the above-mentioned strength relation S1>S2>S3 is achieved by adjusting the belt cord counts of the belt plies 7A, 7B and 7C, while using the same belt cord in the belt plies 7A, 7B and 7C. The reason is that if the belt plies 7A, 7B and 7C have the same cord count, in order to achieve the strength relation S1>S2>S3, it is necessary to minimize the breaking load E1 of a belt cord in the third belt ply 7A.

On the other hand, in the retread operation, an edged tool is need to be inserted between the third belt ply 7C and the second belt ply 7B from the side of the belt edge in order to separate the edge portion of the third belt ply 7C from second belt ply 7B, and then, starting from the separated edge portion, the third belt ply 7A is peeled off from the second belt ply 7B. Therefore, if the breaking load E1 of the belt cords of the third belt ply 7A is smallest, there is a high probability of breaking the third belt ply 7A during peeling off. Thus, it is difficult to remove the third belt ply 7A completely from the tire, and the retreadability becomes decreased.

In this embodiment, from this standpoint, the same belt cords (the same breaking load) are used in the belt plies 7A, 7B and 7C in order to prevent the breaking of the third belt ply 7A during peeling off.

Figure 2:
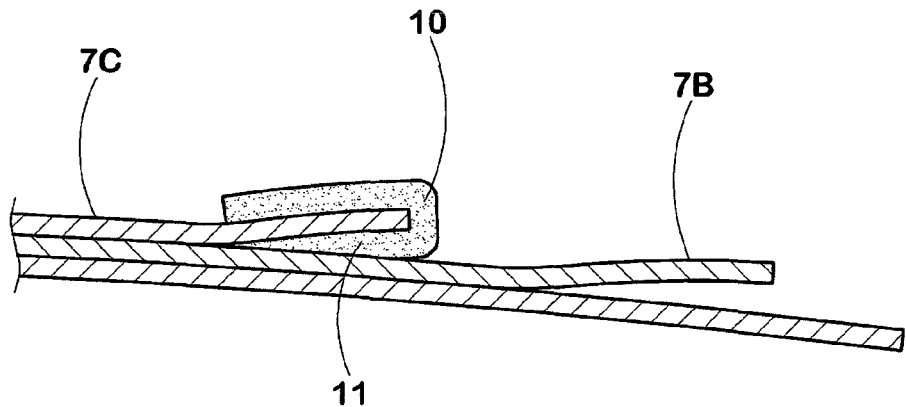
FIG. 2 is an enlarged cross sectional view showing an edge portion of the belt thereof.

In this embodiment, in order to make easy to insert the edged tool between the third belt ply 7C and second belt ply 7B, there is disposed a covering rubber 10 having a u-shaped cross sectional shape wrapping the axially outer edge portion of the third belt ply 7C as shown in FIG. 2.

By the covering rubber 10, the axially outer edge portion of the third belt ply 7C is separated from the second belt ply 7B, and a space 11 (filled with the rubber) for inserting the edged tool is formed.

The radial height of the space 11 (gap) is maximum at the outer edge of the third belt ply 7C, and gradually decreases toward the axially inside.

At the outer edges of the third belt ply 7C and in the vicinity thereof, the radial cord spacing da1 (not shown) between the belt cords of the third belt ply 7C and the belt cords of the second belt ply 7B is set to be more than the radial cord spacing db between the belt cords of the second belt ply 7B and the belt cords of the first belt ply 7A.

Figure 4:
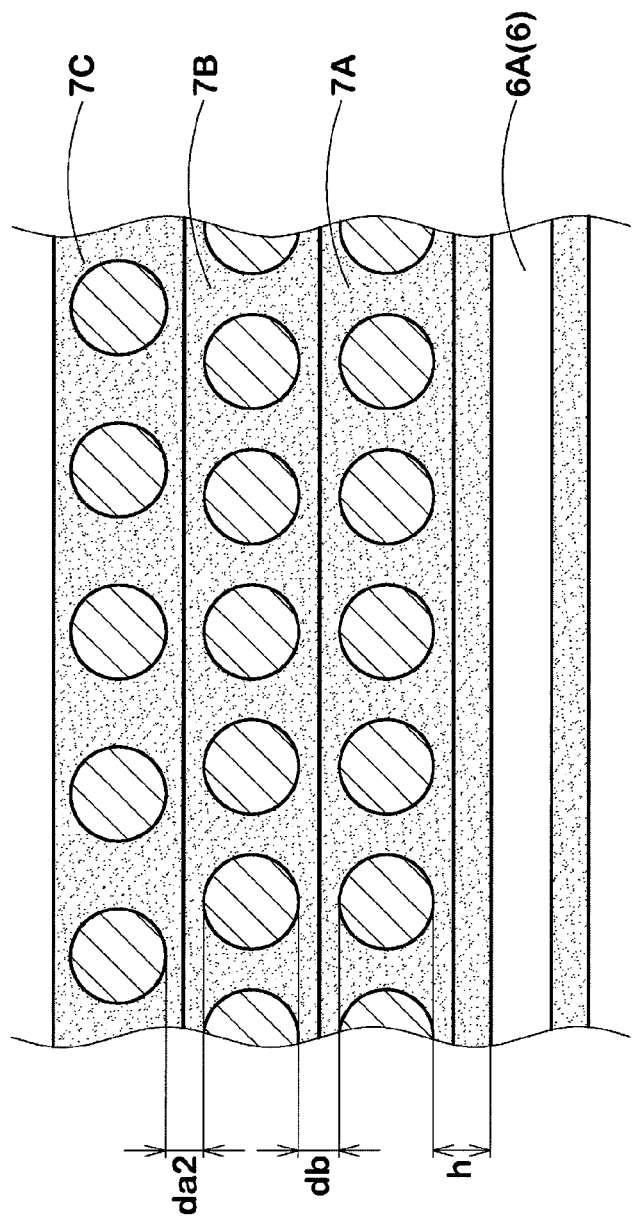
FIG. 4 is an enlarged cross sectional view for explaining belt cord spacings between the belt plies.
Figure 5A:
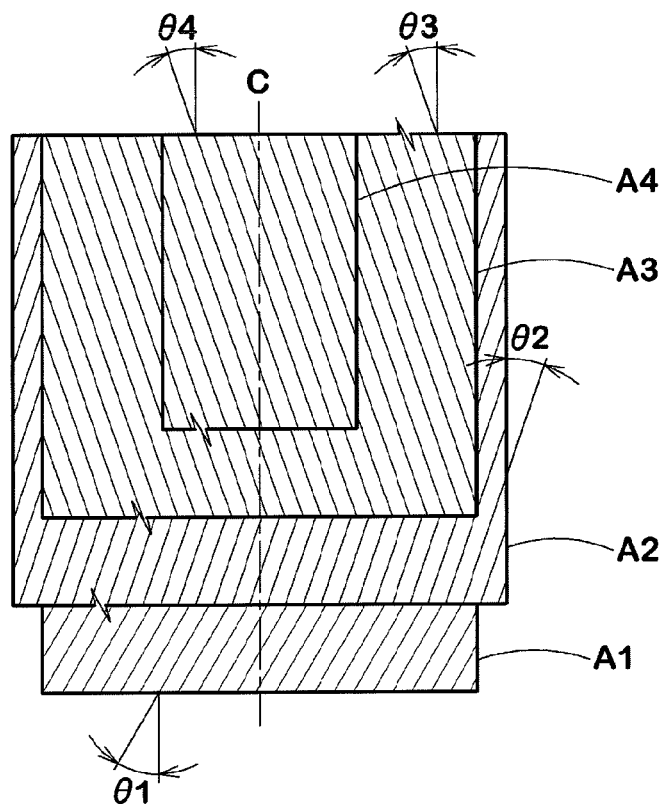
FIGS. 5(A) and 5(B) are diagrams showing belt cord arrangements of conventional belts.
Figure 5B:
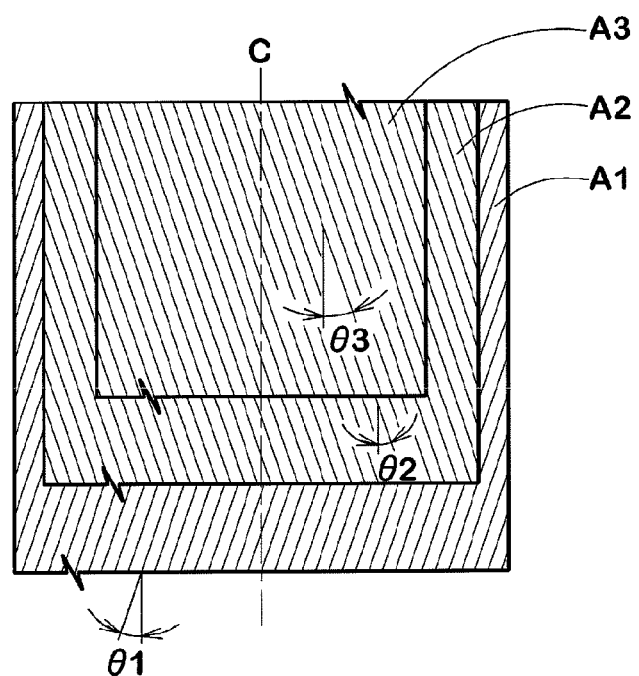

In a part of the third belt ply 7C excepting the outer edges and the above-mentioned vicinity thereof (namely, in the major part between the above-mentioned outer edge portions), as shown in FIG. 4, the radial cord spacing da2 between the belt cords of the third belt ply 7C and the belt cords of the second belt ply 7B is set to be not more than, preferably less than the radial cord spacing db between the belt cords of the second belt ply 7B and the belt cords of the first belt ply 7A.

Preferably, the cord spacings da2 and db are set in a range of from 0.3 to 1.5 mm. Thereby, it becomes easy to remove the third belt ply 7C which facilitates the retread operation. Incidentally, the radial cord spacing means the cord spacing measured in the tire radial direction.

In order to increase the adhesion of the belt cords to the surrounding rubber, the topping rubber of each belt ply 7A, 7B, 7C comprises a cobalt salt of organic acid in its rubber component. As the cobalt salt of organic acid, for example, cobalt stearate, cobalt naphthenate, cobalt neodecanoate, boron tri(cobalt decanoate) and the like can be used.

As for the content of the cobalt salt of organic acid, if it is converted to into the content of cobalt, it is preferable that the content of cobalt is in a range of from 0.1 to 3.0 parts by weight with respect to 100 parts by weight of the rubber component.

If the content of cobalt is less than 0.1 parts by weight, there is a tendency that the adhesion (under high temperatures and high humidity renditions) between the rubber and the plated layer of the steel cord becomes insufficient.

If the content of cobalt is more than 3 parts by weight, there is a tendency that thermal degradation occurs during processing the rubber and during vulcanization.

In this example, the complex elastic modulus E* of the topping rubber is set at a relatively high value within a range of from 5 to 12 MPa. Thereby, the decrease in the belt rigidity due to the three-ply belt structure is recovered, and as a result, it becomes possible to improve the steering stability more than the conventional three-ply structure.

If the complex elastic modulus E* is less than 5 MPa, it is difficult to improve or maintain the steering stability.

If the complex elastic modulus E* is more than 12 MPa, the ride comfort tends to deteriorate.

Therefore, the lower limit of the complex elastic modulus E* is preferably set to be not less than 7 MPa, and the upper limit thereof is preferably set to be not more than 10 MPa.

Here, the complex elastic modulus E* is measured according to Japanese Industrial standard JIS-K6394 by the use of a viscoelastic spectrometer manufactured by Iwamoto seisakusyo K. K. under the following conditions: initial strain=10%; amplitude=+/−1%; frequency=10 Hz; deformation mode=tension; temperature=70 deg. C.

In this embodiment, when measured at the tire equator C, the radial cord spacing h between the belt cords of the first belt ply 7A and the carcass cords of the carcass 6 is set in a range of from 1.0 to 2.0 mm, and more than the cord spacing db between the belt cords of the second belt ply 7B and the belt cords of the first belt ply 7A.

Thereby, in cooperation with the effect of the complex elastic modulus E* of the topping rubber, shock at the time of running over rocks and the like can be mitigated while maintaining the steering stability, and the carcass 6 can be prevented from shock burst.

Comparison Tests

Heavy duty radial tires of size 11R22.5 (rim size: 7.5×22.5) for truck/bus were prepared as test tires, and comparison tests were made on the steering stability, tire strength, retreadability (easiness of removal of ply) and tire weight.

Excepting the belt structures, the test tires had the same structure as shown FIG. 1. The specifications of the belt structures are shown Table 1.

The specifications common to all of the test tires are as follows. The complex elastic modulus E* of the topping rubber of each belt ply was 9 MPa. The complex elastic modulus E* of the covering rubber was 9 MPa. The cord spacings da1 and da2 between the adjacent belt plies were 2.0 mm and 0.5 mm, respectively (da1=2.0 mm, da2=0.5 mm). The cord spacing h between the first belt ply and the adjacent carcass ply was 2.0 mm.

In the table, signs "+" and "−" used for the cord angles θ1, θ2 and θ3 indicate inclining directions of belt cords with respect to the tire equator.

In each of the test tires, an identical steel cord was used in the first to third belt plies as their belt cords, and the ply strengths S1, S2 and S3 were adjusted by changing the cord counts N1, N2 and N3.

(1) Steering Stability Test:

Using an indoor tire tester, the cornering force of each of the test tires was measured under the following conditions:
tire pressure: 700 kPa
tire load: 26.72 kN
slip angle: 1 degree
running speed: 4 km/h The results are indicated in Table 1 by an index based on Conv. tire being 100, wherein the larger the value, the better the steering stability.

(2) Tire Strength Test:

This test was carried out by the use of a tire plunger test machine according to the "tire strength (breaking energy) test" prescribed by Japanese Industrial Standard JIS-D4230, Clause 5.1. Specifically, a conically-shaped weight (plunger) having diameter of 50 mm, height of 100 mm and mass of 5 kg was dropped on the tread portion from a height, and the height at which the tire was broken was measured and converted into the breaking energy. The results are indicated in Table 1 by an index based on Conv. tire being 100. The larger the value, the higher the tire strength.

(3) Retreadability (Easiness of Ply Removal) Test:

Using the drum tester, the tire was run for 10,000 km under the following conditions:
tire pressure 700 kPa,
tire load 26.72 kN,
running speed 80 km/h Then, it was checked whether the radially outermost belt ply could be removed easily and completely. And the easiness was evaluated into three ranks A, B, C of which order is A(best)>B>C.

(4) Tire Weight:

The weight is indicated in Table 1 by an index based on Conv. tire being 100. The smaller the value, the lighter the tire weight.

From the test results, it was confirmed that Example tires can be reused by retreading and the weight reduction is possible without deteriorating the steering stability and tire strength.

TABLE 1

| Tire | Conv. | Ref. 1 | Ref. 2 | Ref. 3 | Ex. 1 | Ex. 2 | Ex. 3 | Ref. 4 |
|---|---|---|---|---|---|---|---|---|
| <first belt ply> | | | | | | | | |
| angle θ1 (deg.) | +50 | +20 | +20 | +20 | +20 | +20 | +20 | +20 |
| strength S1 (kN) | 40 | 70 | 70 | 70 | 70 | 70 | 70 | 70 |
| width W1 (mm) | 80 | 100 | 100 | 100 | 100 | 100 | 100 | 100 |
| <second belt ply> | | | | | | | | |
| angle θ2 (deg.) | +20 | −20 | −20 | −20 | −20 | −20 | −20 | −20 |
| strength S2 (kN) | 50 | 50 | 50 | 50 | 50 | 50 | 50 | 50 |
| width W2 (mm) | 100 | 90 | 90 | 90 | 90 | 90 | 90 | 90 |
| <third belt ply> | | | | | | | | |
| angle θ3 (deg.) | −20 | −20 | −40 | −45 | −50 | −55 | −60 | −65 |
| strength S3 (kN) | 50 | 40 | 40 | 40 | 40 | 40 | 40 | 40 |
| width W3 (mm) | 90 | 60 | 60 | 60 | 60 | 60 | 60 | 60 |
| <fourth belt ply> | with | without | without | without | without | without | without | without |
| angle θ4 (deg.) | −20 | — | — | — | — | — | — | — |
| strength S4 (kN) | 40 | — | — | — | — | — | — | — |
| width W4 (mm) | 60 | — | — | — | — | — | — | — |
| <S2/S1> | 1.25 | 0.71 | 0.71 | 0.71 | 0.71 | 0.71 | 0.71 | 0.71 |
| <|θ2−θ1|> (deg.) | — | 0 | 0 | 0 | 0 | 0 | 0 | 0 |
| <|θ3−θ2|> (deg.) | — | 0 | 20 | 25 | 30 | 35 | 40 | 45 |
| <covering rubber> | without | with | with | with | with | with | with | with |
| <magnitude relation between cord spacings da and db> | same | da1 > db da2 < db | da1 > db da2 < db | da1 > db da2 < db | da1 > db da2 < db | da1 > db da2 < db | da1 > db da2 < db | da1 > db da2 < db |
| Steering stability | 100 | 90 | 100 | 100 | 105 | 105 | 110 | 110 |
| Tire strength | 100 | 115 | 110 | 110 | 110 | 110 | 110 | 100 |
| Completely removed? | no | no | no | no | yes | yes | yes | yes |
| Easiness rank | — | — | — | — | C | B | A | A |
| Tire weight | 100 | 95 | 95 | 95 | 95 | 95 | 95 | 95 |

| Tire | Ref. 5 | Ref. 6 | Ex. 4 | Ex. 5 | Ref. 7 | Ex. 6 | Ref. 8 |
|---|---|---|---|---|---|---|---|
| <first belt ply> | | | | | | | |
| angle θ1 (deg.) | +20 | +20 | +15 | +15 | +15 | +20 | +25 |
| strength S1 (kN) | 70 | 70 | 70 | 70 | 70 | 70 | 70 |
| width W1 (mm) | 100 | 100 | 100 | 100 | 100 | 100 | 100 |
| <second belt ply> | | | | | | | |
| angle θ2 (deg.) | −20 | −20 | −15 | −20 | −25 | −15 | −15 |
| strength S2 (kN) | 50 | 50 | 50 | 50 | 50 | 50 | 50 |
| width W2 (mm) | 90 | 90 | 90 | 90 | 90 | 90 | 90 |
| <third belt ply> | | | | | | | |
| angle θ3 (deg.) | −75 | −85 | −55 | −55 | −55 | −55 | −55 |
| strength S3 (kN) | 40 | 40 | 40 | 40 | 40 | 40 | 40 |
| width W3 (mm) | 60 | 60 | 60 | 60 | 60 | 60 | 60 |
| <fourth belt ply> | without | without | without | without | without | without | without |
| angle θ4 (deg.) | — | — | — | — | — | — | — |
| strength S4 (kN) | — | — | — | — | — | — | — |
| width W4 (mm) | — | — | — | — | — | — | — |
| <S2/S1> | 0.71 | 0.71 | 0.71 | 0.71 | 0.71 | 0.71 | 0.71 |
| <|θ2−θ1|> (deg.) | 0 | 0 | 0 | 5 | 10 | 5 | 10 |
| <|θ3−θ2|> (deg.) | 55 | 65 | 40 | 35 | 30 | 30 | 35 |
| <covering rubber> | with | with | with | with | with | with | with |
| <magnitude relation between cord spacings da and db> | da1 > db da2 < db | da1 > db da2 < db | da1 > db da2 < db | da1 > db da2 < db | da1 > db da2 < db | da1 > db da2 < db | da1 < db da2 < db |
| Steering stability | 107 | 95 | 110 | 110 | 95 | 105 | 98 |
| Tire strength | 98 | 95 | 115 | 110 | 105 | 110 | 110 |
| Completely removed? | yes | yes | yes | yes | yes | yes | yes |
| Easiness rank | A | A | A | B | C | C | B |
| Tire weight | 95 | 95 | 95 | 95 | 95 | 95 | 95 |

| Tire | Ref. 9 | Ref. 10 | Ref. 11 | Ex. 7 | Ex. 8 | Ex. 9 | Ex. 10 |
|---|---|---|---|---|---|---|---|
| <first belt ply> | | | | | | | |
| angle θ1 (deg.) | +20 | +20 | +20 | +20 | +20 | +20 | +20 |
| strength S1 (kN) | 70 | 50 | 70 | 70 | 70 | 70 | 70 |
| width W1 (mm) | 100 | 100 | 100 | 100 | 100 | 100 | 100 |
| <second belt ply> | | | | | | | |
| angle θ2 (deg.) | −20 | −20 | −20 | −20 | −20 | −20 | −20 |
| strength S2 (kN) | 70 | 70 | 70 | 50 | 50 | 50 | 50 |
| width W2 (mm) | 90 | 90 | 90 | 90 | 90 | 90 | 90 |

TABLE 1-continued

| <third belt ply> | | | | | | | |
|---|---|---|---|---|---|---|---|
| angle θ3 (deg.) | −55 | −55 | −55 | −55 | −55 | −55 | −55 |
| strength S3 (kN) | 40 | 40 | 70 | 40 | 40 | 40 | 40 |
| width W3 (mm) | 60 | 60 | 60 | 60 | 60 | 60 | 60 |
| <fourth belt ply> | without | without | without | without | without | without | without |
| angle θ4 (deg.) | — | — | — | — | — | — | — |
| strength S4 (kN) | — | — | — | — | — | — | — |
| width W4 (mm) | — | — | — | — | — | — | — |
| <S2/S1> | 1.00 | 1.40 | 1.00 | 0.71 | 0.71 | 0.71 | 0.71 |
| <|θ2−θ1|> (deg.) | 0 | 0 | 0 | 0 | 0 | 0 | 0 |
| <|θ3−θ2|> (deg.) | 35 | 35 | 35 | 35 | 35 | 35 | 35 |
| <covering rubber> | with | with | with | without | with | with | with |
| <magnitude relation between cord spacings da and db> | da1 > db da2 < db | da1 > db da2 < db | da1 > db da2 < db | da1 > db da2 < db | da1 > db da2 < db | da1 > db da2 < db | da1 > db da2 = db |
| Steering stability | 105 | 105 | 105 | 105 | 105 | 105 | 105 |
| Tire strength | 110 | 95 | 105 | 110 | 110 | 110 | 110 |
| Completely removed? | yes | yes | yes | yes | yes | yes | yes |
| Easiness rank | B | B | B | C | B | B | B |
| Tire weight | 105 | 95 | 107 | 95 | 95 | 95 | 96 |

The invention claimed is:

1. A heavy duty tire, comprising:
    a tread portion,
    a pair of sidewall portions,
    a pair of bead portions each with a bead core therein,
    a carcass made of carcass cords and extending between the bead portions through the tread portion and the sidewall portions, and
    a belt disposed radially outside the carcass in the tread portion,
    wherein the belt comprises:
        a radially innermost first belt ply disposed radially outside the carcass,
        a second belt ply disposed on the first belt ply, and
        a radially outermost third belt ply disposed on the second belt ply, wherein
    the first belt ply is made of belt cords laid at an angle θ1 of 15 to 25 degrees with respect to the tire equator,
    the second belt ply is made of belt cords laid at an angle θ2 of 15 to 25 degrees with respect to the tire equator,
    the third belt ply is made of belt cords laid at an angle θ3 of 45 to 60 degrees with respect to the tire equator,
    with respect to the tire equator, the belt cords of the second belt ply are inclined oppositely to the belt cords of the first belt ply,
    with respect to the tire equator, the belt cords of the third belt ply are inclined to the same direction as the belt cords of the second belt ply,
    the difference |θ2−θ1| between the angles θ1 and θ2 is not more than 5 degrees,
    the difference |θ3−θ2| between the angles θ2 and θ3 is 30 to 45 degrees,
    the axial widths W1, W2 and W3 of the first, second and third belt plies, respectively, satisfy: W1>W2>W3,
    ply strengths S1, S2 and S3 of the first, second and third belt plies, respectively, satisfy:
    S1>S2>S3, and
    1.0>S2/S1>=0.6,
    wherein, when measured at the axial edges of the third belt ply, the radial cord spacing (da2) between the belt cords of the third belt ply and the belt cords of the second belt ply is more than the radial cord spacing (db) between the belt cords of the second belt ply and the belt cords of the first belt ply,
    wherein, when measured in a part of the third belt ply between axial edge portions of the third belt ply, the radial cord spacing (da2) between the belt cords of the third belt ply and the belt cords of the second belt ply is less than the radial cord spacing (db) between the belt cords of the second belt ply and the belt cords of the first belt ply,
    wherein, when measured at the tire equator, a radial cord spacing (db) between the belt cords of the second belt ply and the belt cords of the first belt ply is in a range of from 0.3 to 1.5 mm, and
    wherein, when measured at the tire equator, a radial cord spacing (h) between the belt cords of the first belt ply and the adjacent carcass cords of the carcass is more than a radial cord spacing (db) between the belt cords of the second belt ply and the belt cords of the first belt ply.

2. The heavy duty tire according to claim 1, which further comprises
    a covering rubber having a U-shaped cross sectional shape and wrapping the axially outer edge portion of the third belt ply so that the axially outer edge portion of the third belt ply is separated from the second belt ply.

3. The heavy duty tire according to claim 2, in which
    each of the first, second and third belt plies is rubberized with a topping rubber whose complex elastic modulus E* is in a range of from 5 to 12 MPa, and
    when measured at the tire equator:
    a radial cord spacing between the belt cords of the third belt ply and the belt cords of the second belt ply is in a range of from 0.3 to 1.5 mm; and
    a radial cord spacing between the belt cords of the first belt ply and the adjacent carcass cords of the carcass is in a range of from 1.0 to 2.0 mm.

4. The heavy duty tire according to claim 2, wherein the ply strengths S1 and S2 of the first and second belt plies, respectively, satisfy: 0.6=<S2/S1<0.8.

5. The heavy duty tire according to claim 1, in which
    each of the first, second and third belt plies is rubberized with a topping rubber whose complex elastic modulus E* is in a range of from 5 to 12 MPa, and
    when measured at the tire equator:
        the radial cord spacing between the belt cords of the third belt ply and the belt cords of the second belt ply is in a range of from 0.3 to 1.5 mm; and
        the radial cord spacing between the belt cords of the first belt ply and the adjacent carcass cords of the carcass is in a range of from 1.0 to 2.0 mm.

6. The heavy duty tire according to claim 5, wherein the ply strengths S1 and S2 of the first and second belt plies, respectively, satisfy: 0.6=<S2/S1<0.8.

7. The heavy duty tire according to claim 1, wherein the ply strengths S1 and S2 of the first and second belt plies, respectively, satisfy: 0.6=<S2/S1<0.8.

8. The heavy duty tire according to claim 1, wherein the carcass is made up of a single ply of carcass cords arranged at an angle of from 80 to 90 degrees with respect to the tire equator.

* * * * *